UNITED STATES PATENT OFFICE.

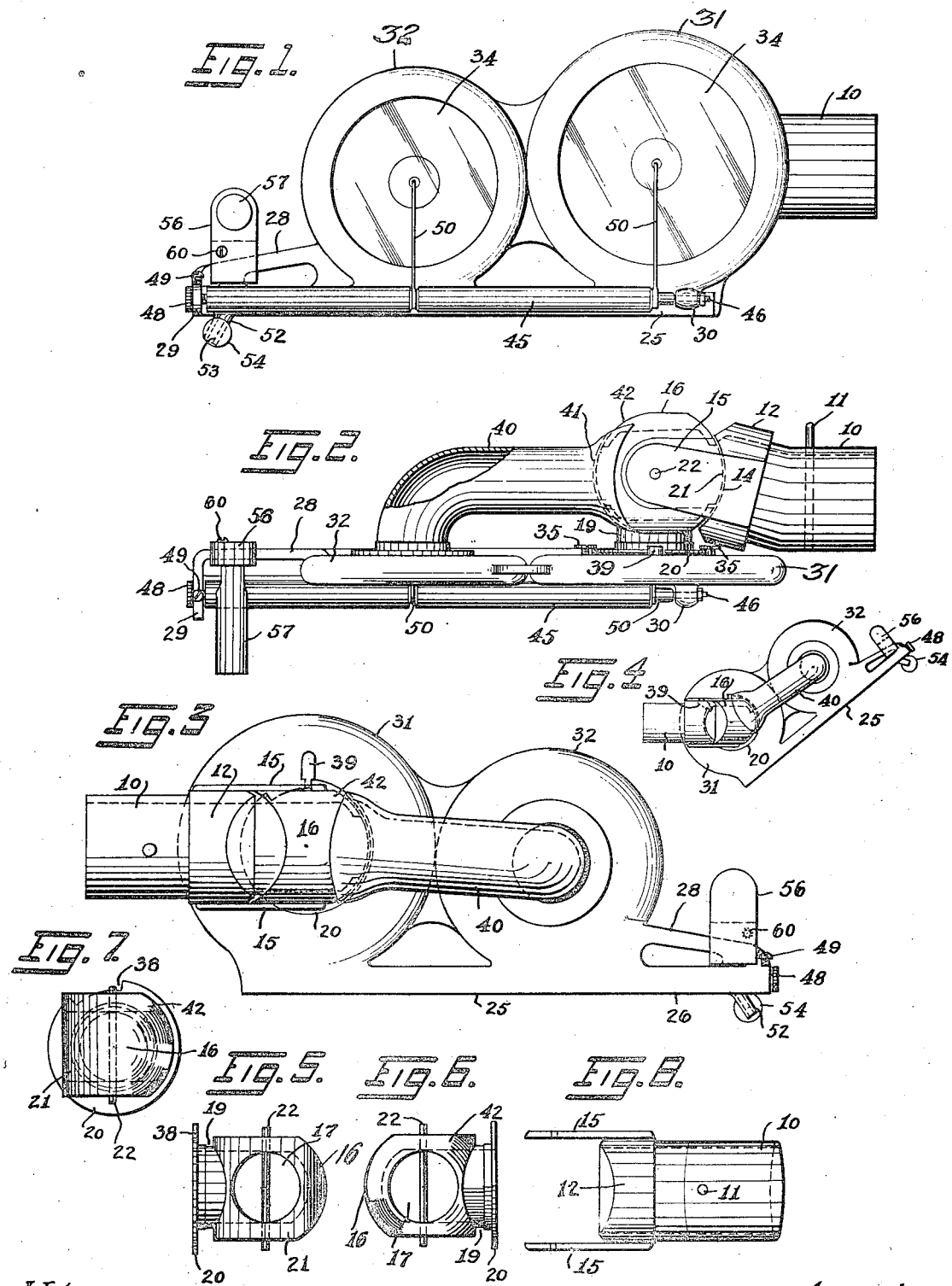

ALBERT W. MILLS, OF WEST ORANGE, NEW JERSEY.

SOUND-BOX FOR PHONOGRAPHS.

1,309,766.  Specification of Letters Patent.  Patented July 15, 1919.

Application filed June 19, 1918. Serial No. 240,820.

*To all whom it may concern:*

Be it known that I, ALBERT W. MILLS, a citizen of the United States, residing in West Orange, in the county of Essex and State of New Jersey, have invented certain new and useful Improvements in Sound-Boxes for Phonographs, of which the following is a specification.

This invention relates to sound reproducing attachments or sound boxes for phonographs and the like and has for its object to provide a sound reproducer adapted for all amplitudes of tones, and one in which the pressure of the needle upon the record disk may be varied within the desired limits.

Another object of the invention is to produce a new and improved connection between the sound box and the amplifying horn adapting the reproducer for convenient and efficient use.

Another object is to improve generally attachments of this kind.

In the accompanying drawing, showing by way of example one of many possible embodiments of the invention, Figure 1 is a side elevation of the attachment;

Fig. 2 is a plan of the same;

Fig. 3 is a view of the reverse side of the attachment;

Fig. 4 is a view on a reduced scale similar to Fig. 3, showing the needle raised from the record disk;

Fig. 5 is a side view of the connecting member to which the sound boxes are connected;

Fig. 6 is a view of the reverse side of the connecting member;

Fig. 7 is an end view of the same; and

Fig. 8 is a side elevation of the sound tube to which the connecting member is pivotally connected.

My sound reproducing attachment is adapted for use with any usual or desired form of sound reproducing machine, and is provided with a sound tube 10 communicating with and adapted to be received in or on the sound arm or other conduit leading to the amplifying horn of the phonograph (not shown). Ordinarily the sound tube 10 is immovably secured in place and is there secured by means of a pin 11 passing through said tone arm or conduit and the sound tube.

The outer end portion of the sound tube 10 is provided with an enlargement 12 provided with an axially vertically disposed cylindrically concaved surface 14. Above and below said surface there are secured, on said enlargement, a pair of upper and lower brackets 15, provided with alined openings between which brackets, there is disposed pivotally a hollow member 16 provided with a throughway opening 17 (Fig. 5) passing entirely through said member. From said opening 17 and communicating therewith, there branches a lateral conduit 19, surrounded by an annular flange 20. Said throughway opening and said conduit together form a threeway opening or passage for conducting sound as will be explained. Surrounding the inner end of said throughway opening 17, said member is provided with a convexed cylindrical face 21, substantially engaging and conforming the concaved surface 14.

A pin 22 (Fig. 2) passing through said alined openings of the bracket and said hollow member holds the hollow member pivotally disposed between the brackets.

There is provided a supporting member 25 formed at its outer end with an extension 26 and a rail 28 and near both ends with bearing brackets 29 and 30, Figs. 2 and 3. Said support is also formed with a pair of sound boxes 31 and 32 arranged in alinement each provided with the usual diaphragm 34 and the usual sound opening. The sound opening of the inner sound box 31 is disposed in registry with the conduit 19 and is provided with a plurality of screws 35, the undercut heads of which engage over said annular flange 20, and hold the support 25 fulcrumed on said conduit and adapted for movement in a vertical plane. Said flange 20 is provided with an arcuate slot or recess 38 (Fig. 7) in which is disposed a limiting member 39 (Fig. 2) fixed on said inner sound box 31 and adapted to engage the ends of said recess and limit the vertical-plane movement of the supporting member.

The neck 40 secured to said outer sound box 32 in registry with the sound opening thereof is provided at its inner end with a spherically concaved face 41 adapted to engage the spherically convexed face 42 surrounding the outer end of said throughway opening of the hollow member 16. By this arrangement, as the supporting member 25 is moved in a vertical plane, (Fig. 4) the interior of said neck 40 is held in communication with said throughway opening 19 and the tube 10.

Between said bearing brackets 29 and 30 there is disposed a shaft 45 provided with a projecting end spindle 46 received in the bracket 30, the shaft 45, lying in substantially the same horizontal plane as the bottoms of the sound boxes 31 and 32. There is disposed in the outer bracket 29 an adjusting screw 48 adapted to engage in a suitable depression in the end of the shaft 45 and held in adjusted relation therewith by means of a set screw 49. Upon this shaft there are fixed tone rods or levers 50 suitably connected to the center of the diaphragms 34. Upon the outer end of the shaft 45 there is fixed at an incline to the shaft 45 a needle receiving bar 52 provided with a socket 53 for receiving the needle and a set screw 54 for holding the needle in place, to permit the needle to engage the record disk at an incline to the surface thereof, to afford a gliding movement to the needle.

Straddling the rail 28 there is adjustably disposed a weight 56, bifurcated at its lower end for engaging the rail, and provided with a suitable manipulating handle 57, Figs. 1 and 3. Said weight 56 is held in adjusted position by means of a small screw 60 engaging the bifurcations of the support and clamping them against the rail.

In operation my improved attachment is adapted by the pivotal connection of the pin 22 for movement in a horizontal plane for the usual disk record. The pivotal connection of the screws 55 with the flange 20 permits movement in a vertical plane for removing the needle from the record. The adjustable weight 58 is adapted to be adjusted back and forward upon the rail 28, until the desired degree of pressure by the needle upon the record disk is obtained.

The attachment shown is adapted for lateral cut records, but it is understood, that the invention is not so limited and that many changes may be made in the details of construction and combination without departing from the spirit of my invention or exceeding the scope of the claims. The sounds from the sound boxes are added together in the throughway passage 17; and it is noted that the disks 34 are of different sizes and, therefore, of different amplitudes so that one disk may best produce one class of tone while the other best produces another class of tone whereby the reproducer produces and adds all classes of tones. It is, of course, understood that the number of sound boxes is not limited to two.

I claim:
1. An apparatus for phonographs comprising sound boxes, a sound tube, a throughway member having a convex outer surface, means for communication between the throughway member and the sound tube, diaphragms for the sound boxes, individual means for communication between the sound boxes and said throughway member, said means for communication for one of the sound boxes being a neck having a concave mouth for engaging the convex outer surface of the throughway member, a vibratory shaft, means for supporting the sound boxes and the vibratory shaft, means for connecting the vibratory shaft to the diaphragms of the sound boxes, and a record-disk operated means for vibrating said shaft.

2. An apparatus for phonographs comprising sound boxes, a sound tube, a throughway member having a convex outer surface, means for communication between the throughway member and the sound tube, diaphragms for the sound boxes, individual means for communication between the sound boxes and said throughway member, said means for communication for one of the sound boxes being a neck having a concave mouth for engaging the convex outer surface of the throughway member, a vibratory shaft, means for supporting the sound boxes and the vibratory shaft for vertical movement of the sound boxes and said shaft, means for connecting the vibratory shaft to the sound boxes, and a record-disk operated means for vibrating said shaft.

3. In an apparatus of the character described, the combination of a sound tube; a hollow member pivotally mounted on said tube and provided with a conduit and a throughway opening passing entirely through the member and having its inner end communicating with the tube; and its outer end surrounded by a spherical surface; a supporting member provided with an outer and an inner sound box each provided with a sound opening, the sound opening of the inner sound box communicating with and having pivotal connection with said conduit; diaphragms secured in said sound boxes; a neck secured to said outer sound box in registry with sound openings, and provided at its inner end with a concaved face engaging said spherical surface; and a needle carrying means pivotally mounted on said support and connected to said diaphragms.

ALBERT W. MILLS.

Witnesses:
H. M. KILPATRICK,
H. D. PENNEY.